Patented May 26, 1953

2,640,057

UNITED STATES PATENT OFFICE 2,640,057

REACTIONS OF HETEROCYCLIC COMPOUNDS WITH UNSATURATED CARBONYL COMPOUNDS

Irving D. Webb, Holly Oak, and Gerald T. Borcherdt, Newark, Del., assignors to E. I. du Pont de Nemours & Company, Wilmington, Del., a corporation of Delaware No Drawing. Application September 29, 1950, Serial No. 187,664

8 Claims. (Cl. 260—326.5)

This invention relates to a process for preparing substituted heterocyclic compounds by the reaction of heterocyclic compounds with certain unsaturated carbonyl compounds. More particularly, it relates to the reaction of compounds such as furan and pyrrole with carbonyl compounds such as acrolein and methyl vinyl ketone to produce difunctional compounds.

It is known that the Diels-Alder reaction can be carried out by heating certain heterocyclic compounds with various unsaturated carbonyl compounds in the absence of a catalyst. This uncatalyzed reaction is illustrated by the following formula:

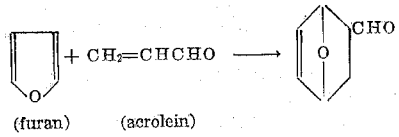

(furan)   (acrolein)

The process of the present invention differs from the Diels-Alder reaction in that it is carried out in the presence of an acid catalyst, with the result that the reaction takes a different course, as indicated by the following formula:

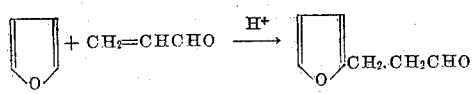

The important advantages of this acid-catalyzed addition reaction have not been realized heretofore, because no method was known whereby the reaction could be carried out so as to produce high yields of the desired addition products.

It is an object of this invention to provide an improved process for carrying out the reaction of certain heterocyclic compounds with certain unsaturated carbonyl compounds. Another object of the invention is to provide an improved process for preparing substituted furans and substituted pyrroles. A further object of the invention is to provide a process for preparing intermediates which may be converted into difunctional aliphatic compounds. Other objects of the invention will appear hereinafter.

In accordance with this invention, it has been discovered that high yields of substituted heterocyclic compounds can be obtained by carrying out the reaction of a heterocyclic compound having a 5-membered ring containing the grouping —CH=CH—CH=C< with an unsaturated carbonyl compound containing a grouping

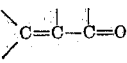

in the presence of an acid catalyst and in the presence of large amounts of water as a diluent. At least one mol of water per mol of carbonyl compound must be employed. Preferably from 1 to 10 mols of water per mol of carbonyl compound are employed. The presence of the large amount of water greatly increases the yields of the desired addition products over those obtainable in the absence of water and almost completely eliminates the large amount of polymerization which these heterocyclic compounds are known to undergo ordinarily in the presence of acid catalysts.

Under the conditions of the present invention, the course of the reaction is such that either one or two mols of the unsaturated carbonyl compound may add to the heterocyclic compound, the addition taking place at the two- and/or five position, as illustrated by the following typical equations:

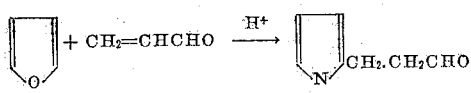

(Equation 1)

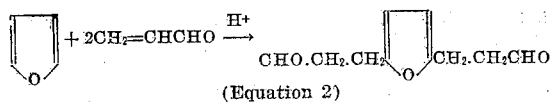

(Equation 2)

According to a preferred embodiment of the invention, there is employed a two- to threefold excess of the heterocyclic compound over the stoichiometric amount required for reaction with the carbonyl compound. The use of this excess tends to further eliminate the formation of resinous by-products and, surprisingly enough, does not appear to affect appreciably the ratio of mono- to bis-adducts obtained. The unreacted heterocyclic compound can of course be recycled.

Among the heterocyclic compounds which may be employed in the present invention, there may be mentioned furan, pyrrole, thiophene, methylfurylacrylate, furfural, 2(3-oxobutyl)-pyrrole, furanpropionaldehyde, pyrrolepropionaldehyde, furylacrolein and the like. It will be observed that all of these compounds contain a 5-membered heterocyclic ring characterized by the structure —CH=CH—CH=C<. These compounds are further characterized by having an active hydrogen atom attached to either one or both carbon atoms adjacent to the hetero-atom.

Typical of the unsaturated carbonyl compounds which may be employed in the present invention are acrolein, methyl vinyl ketone, methyl acrylate, methyl methacrylate, acrylic acid, methacrylic acid, maleic acid, maleic anhydride, fumaric acid, maleic esters, crotonaldehyde, and the like. It will be observed that each of these compounds contains the characteristic grouping,

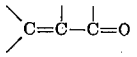

The preferred heterocyclic compounds are furan and pyrrole, while the preferred carbonyl compounds are acrolein and methyl vinyl ketone.

Any of the relatively strong acids serve to catalyze the reaction. Among the more useful catalysts there may be mentioned the aqueous solutions of sulfur dioxide, boron trifluoride, sulphuric acid, acetic acid and the like. In general, a pH of about three has proved to be most satisfactory, although of course the optimum pH varies with the reactants. For example, methyl vinyl ketone is less reactive and less prone to copolymerize than acrolein and consequently, a lower pH may be used. On the other hand, pyrrole is more reactive than thiophene and consequently generally reacts at a higher pH.

An essential feature of the present invention is the presence of a relatively large amount of water as a diluent, i. e., there must be present at least one mol of water per mol of carbonyl compound. Preferably from 1 to 10 mols of water per mol of carbonyl compound are employed. Other diluents or solvents such as alcohol, acetic acid, etc., may also be present, if desired, along with the water. Temperatures from about 25° C. up to about 150° C. may be employed, although temperatures of about 90° to 140° C. are generally preferred. Mol ratios of heterocyclic compound to carbonyl compound may vary from 4:1 to 1:3, depending, to some extent, on the nature of the reactants and upon whether it is desired to prepare the mono- or di-adduct of a heterocyclic compound having two active hydrogen atoms. As pointed out above, it is generally preferred to employ a two- to threefold excess of the heterocyclic compound, since by-product formation is thereby minimized without appreciably altering the amount of di-adduct which is obtained.

The preferred products obtained by the process of this invention are the di-substituted heterocyclic compounds, such as 2,5-bis(3-oxobutyl)furan, 2,5 - bis(3 - oxobutyl)pyrrole, 2,5-furandipropionaldehyde and 2,5-pyrroledipropionaldehyde. These compounds may be converted to difunctional derivatives, such as dihydroxy compounds, dicarboxylic acids, diamines, amino acids, etc., all of which still contain the heterocyclic structure. Such compounds may be used for instance to prepare polyamides or polyesters which may possess unique dye-receptive properties. Furthermore, these di-substituted heterocyclic compounds may be treated in such a way that the heterocyclic ring structure is opened and straight-chain aliphatic difunctional compounds are produced. The preferred method for achieving this opening of the ring involves hydrogenolysis of the ring compounds at elevated temperatures and pressures in the presence of hydrogenation catalyst. This hydrogenolysis is preferably carried out at a temperature of about 200° to 400° C. and at a superatmospheric pressure of about 100 to 1000 atmospheres. Hydrogenation catalyst such as nickel, cobalt, copper, copper chromite, platinum, palladium and the like may be employed to advantage. This hydrogenolysis reaction will be illustrated in several of the examples which follow:

*Example 1.*—To a stirred mixture of 50 ml. water containing 1 g. $SO_2$, 35 g. pyrrole (0.5 mol) and 0.5 g. hydroquinone at 60° C. was added 70 g. methyl vinyl ketone (1 mol) at such a rate that the temperature remained at 60° C. for a period of about one hour. After an additional 30 minutes at 60° C., the mixture was chilled, and the pale yellow crystals of 2,5-bis(3-oxobutyl)pyrrole were filtered and dried. Yield 86 g. or 80%. Crystallization from methanol gave white plates melting at 75° to 79° C. Calculated for $C_{12}H_{17}O_2N$; C, 69.5%, H, 8.3%; N, 6.77%. Found: C, 68.7%; H, 8.2%; N, 6.68%.

*Example 2.*—A mixture of 68 g. furan (1 mol), 28 g. acrolein (0.5 mol), 1 g. hydroquinone, 50 ml. water and 5 ml. acetic acid was heated at 130°–150° C. for two hours in a steel shaker tube. The organic layer was distilled, and after unreacted furan and acrolein were removed, 8.7 g. of 2-furanpropionaldehyde, 23.2 g. 2,5-furandipropionaldehyde and 7.5 g. resin were obtained. Based upon acrolein, these figures represent a 14%, 52% and 12% conversion to mono-adduct, bis-adduct, and heel, respectively, assuming the heel to be a 1:1 copolymer of furan and acrolein. The combined yield of adducts on this basis is 85%.

*Example 3.*—Furan and methyl vinyl ketone in a mol ratio of 2:1 were heated for about two hours at 130° C. in the presence of an aqueous solution of $SO_2$ as the catalyst. 2-(3-oxobutyl)-furan, and 2,5-bis(3-oxobutyl)furan were obtained in a weight ratio of about 1.3:1 and in a combined yield of 95% based on methyl vinyl ketone.

*Example 4.*—The process of Example 3 was repeated using about 1% $SO_2$ as the catalyst and operating at 90° C. instead of 130° C. The mono- and di-adducts were obtained in a weight ratio of about 4:5 and in a combined yield of 93%.

*Example 5.*—Acrolein was added dropwise to furan in the presence of an aqueous solution of $SO_2$ at a temperature of about 30° C. A yield of about 10% of the combined mono- and dipropionaldehyde-substituted furans was obtained.

*Example 6.*—2 - furanpropionaldehyde is reacted with an equal molecular amount of acrolein in the presence of an aqueous solution containing 1% $SO_2$ at a temperature of about 130° C. to give a good yield of 2,5-furandipropionaldehyde.

*Example 7.*—2,5 - furandipropionaldehyde was treated with hydrogen at a temperature of 300° C., and at a pressure of 300 to 600 atmospheres in the presence of a methanol solvent and a copper chromite hydrogenation catalyst. Decamethylene glycol was obtained in 35% yield. Other products were a material having a boiling point of 170° C./10 mm. and the formula $C_{10}H_{19}O_2$, and 2-propyl-5-hydroxypropyltetrahydrofuran.

One of the important advantages of the present invention is that it makes possible for the first time the obtaining of high yields in the first step of an over-all two-step process for preparing long-chain aliphatic difunctional compounds. In this over-all process, two mols of acrolein are added to one mol of furan, for example, and the resulting dialdehyde is hydrogenated to give decamethylene glycol. Furthermore, furfural may be reacted in known manner with acetaldehyde to produce furylacrolein, which in turn is reacted with acrolein according to the process of this invention and then hydrogenated to give decamethylene glycol.

The various compounds produced in accordance with this invention may be converted into a large number of other useful compounds for example by oxidation, by hydrogenation, by reductive animation, by cyanation, etc. The resulting dibasic acids, diamines, dihydroxy compounds, amino acids and the like are highly useful in the preparation of polyamides and polyesters. The heterocyclic ring in these compounds may or may not be hydrogenated. Furthermore, any of these heterocyclic derivatives may be subjected to a ring-splitting operation, preferably by hydrogenolysis, to prepare difunctional aliphatic compounds which are also extremely useful in the preparation of polyamides, polyesters, polymeric plasticizers and for many other purposes.

Any of the reactions disclosed herein may be carried out either batchwise or in a continuous manner.

We claim:

1. A process which comprises reacting a heterocyclic compound taken from the group consisting of furan, pyrrole, thiophene, methyl furylacrylate, furfural, 2(3 - oxobutyl)pyrrole, furanpropionaldehyde, pyrrolepropionaldehyde, and furylacrolein, with an ethylenic dienophile, containing an ethylenic linkage and a carbonyl group joined through a single covalent bond, at a temperature of from 25° C. to 150° C. in the presence of an acid catalyst taken from the group consisting of sulfur dioxide, sulfuric acid, acetic acid, and boron trifluoride and, as a diluent, at least one mol of water per mol of dienophile.

2. A process which comprises reacting furan with an ethylenic dienophile, containing an ethylenic linkage and a carbonyl group joined through a single covalent bond, at a temperature of from 25° C. to 150° C. in the presence of an acid catalyst taken from the group consisting of sulfur dioxide, sulfuric acid, acetic acid, and boron trifluoride and, as a diluent, at least one mol of water per mol of dienophile.

3. A process which comprises reacting pyrrole with an ethylenic dienophile, containing an ethylenic linkage and a carbonyl group joined through a single covalent bond, at a temperature of from 25° C. to 150° C. in the presence of an acid catalyst taken from the group consisting of sulfur dioxide, sulfuric acid, acetic acid, and boron trifluoride and, as a diluent, at least one mol of water per mol of dienophile.

4. A process which comprises reacting acrolein with a heterocyclic compound taken from the group consisting of furan, pyrrole, thiophene, methyl furylacrylate, furfural, 2(3-oxobutyl)-pyrrole, furanpropionaldehyde, pyrrolepropionaldehyde, and furylacrolein, at a temperature of from 25° C. to 150° C. in the presence of an acid catalyst taken from the group consisting of sulfur dioxide, sulfuric acid, acetic acid, and boron trifluoride and, as a diluent, at least one mol of water per mol of acrolein.

5. A process which comprises reacting methyl vinyl ketone with a heterocyclic compound taken from the group consisting of furan, pyrrole, thiophene, methyl furylacrylate, furfural, 2(3-oxobutyl)pyrrole, furanpropionaldehyde, pyrrolepropionaldehyde, and furylacrolein, at a temperature of from 25° C. to 150° C. in the presence of an acid catalyst taken from the group consisting of sulfur dioxide, sulfuric acid, acetic acid, and boron trifluoride and, as a diluent, at least one mol of water per mol of methyl vinyl ketone.

6. A process which comprises reacting from two to three mols of a heterocyclic compound taken from the group consisting of furan, pyrrole, thiophene, methyl furylacrylate, furfural, 2(3 - oxobutyl)pyrrole, furanpropionaldehyde, pyrrolepropionaldehyde, and furylacrolein, with two mols of an ethylenic dienophile, containing an ethylenic linkage and a carbonyl group joined through a single covalent bond, at a temperature of from 25° C. to 150° C. in the presence of an acid catalyst taken from the group consisting of sulfur dioxide, sulfuric acid, acetic acid, and boron trifluoride and, as a diluent, at least one mol of water per mol of dienophile.

7. A process which comprises reacting a heterocyclic compound taken from the group consisting of furan, pyrrole, thiophene, methyl furylacrylate, furfural, 2(3-oxobutyl)pyrrole, furanpropionaldehyde, pyrrolepropionaldehyde, and furylacrolein, with an ethylenic dienophile, containing an ethylenic linkage and a carbonyl group joined through a single covalent bond, at a temperature of from 90° C. to 140° C. in the presence of an acid catalyst taken from the group consisting of sulfur dioxide, sulfuric acid, acetic acid, and boron trifluoride and, as a diluent, at least one mol of water per mol of dienophile.

8. A process which comprises reacting a heterocyclic compound taken from the group consisting of furan, pyrrole, thiophene, methyl furylacrylate, furfural, 2(3-oxobutyl)pyrrole, furanpropionaldehyde, pyrrolepropionaldehyde, and furylacrolein, with an ethylenic dienophile, containing an ethylenic linkage and a carbonyl group joined through a single covalent bond, at a temperature of from 25° C. to 150° C. in the presence of an acid catalyst taken from the group consisting of sufur dioxide, sulfuric acid, acetic acid, and boron trifluoride and, as a diluent, from one to ten mols of water per mol of dienophile.

IRVING D. WEBB.
GERALD T. BORCHERDT.

References Cited in the file of this patent

FOREIGN PATENTS

| Number | Country | Date |
|---|---|---|
| 561,901 | Germany | Apr. 19, 1931 |

OTHER REFERENCES

Alder et al., Berichte 76B, pp. 183–205 (1943).
Kariyone—Jr. Pharmaceutical Society of Japan No. 515, January 1925, pp. 1–22.
Adams et al.—Organic Reactions—vol. 4, pp. 65 and 87–88.